(12) United States Patent
Decker et al.

(10) Patent No.: US 10,048,006 B2
(45) Date of Patent: Aug. 14, 2018

(54) ELEMENT FOR ANCHORING AN ANTI-EROSION COATING TO AN INNER WALL OF A CHAMBER OF AN FCC UNIT

(71) Applicant: Total Raffinage Chimie, Courbevoie (FR)

(72) Inventors: Sébastien Decker, Octeville sur Mer (FR); Hubert Simon, Le Havre (FR)

(73) Assignee: TOTAL RAFFINAGE CHIMIE, Courbevoie (FR)

( * ) Notice: Subject to any disclaimer, the term of this patent is extended or adjusted under 35 U.S.C. 154(b) by 0 days.

(21) Appl. No.: 15/524,820

(22) PCT Filed: Nov. 3, 2015

(86) PCT No.: PCT/EP2015/075515
§ 371 (c)(1),
(2) Date: May 5, 2017

(87) PCT Pub. No.: WO2016/071305
PCT Pub. Date: May 12, 2016

(65) Prior Publication Data
US 2017/0321962 A1 Nov. 9, 2017

(30) Foreign Application Priority Data

Nov. 7, 2014 (FR) .................................. 14 60778

(51) Int. Cl.
*F27D 1/14* (2006.01)
*F27D 1/16* (2006.01)
(Continued)

(52) U.S. Cl.
CPC ............ *F27D 1/141* (2013.01); *B01J 8/1872* (2013.01); *B32B 3/12* (2013.01); *B32B 15/18* (2013.01);
(Continued)

(58) Field of Classification Search
CPC ....... F27D 1/141; F27D 1/1684; C22C 38/50; C22C 38/04; C10G 11/18; B01J 8/1872;
(Continued)

(56) References Cited

U.S. PATENT DOCUMENTS 1,974,279 A * 9/1934 Jones ................. B29D 99/0057
404/32
3,156,041 A * 11/1964 Gault ................... B23K 1/0014
228/181
(Continued)

FOREIGN PATENT DOCUMENTS

WO  2014009625 A1  1/2014

OTHER PUBLICATIONS

International Preliminary Report on Patentability issued in PCT/EP2015/075515, dated May 9, 2017, 10 pages.

*Primary Examiner* — Jeanette E Chapman
(74) *Attorney, Agent, or Firm* — Albert Shung

(57) ABSTRACT

The invention relates to a metal element (12) for anchoring an anti-erosion coating that is intended to be fastened alone in an isolated manner to a metal wall or assembled with other identical anchoring elements. The anchoring element (12) has an edge (12a) for fastening to said metal wall and an anchoring body firmly attached to the fastening edge (12a) and having an upper edge (12b) that is away from the fastening edge and intended to be covered by a composite material of concrete type. A section of this upper edge (12b), which is not intended to be juxtaposed and assembled with an upper edge of an identical anchoring element, is provided with a delimiting tab (16) in order to delimit a height of composite material that must cover the upper edge (12b) of said anchoring element, said delimiting tab (16) having a
(Continued)

Figure 1:
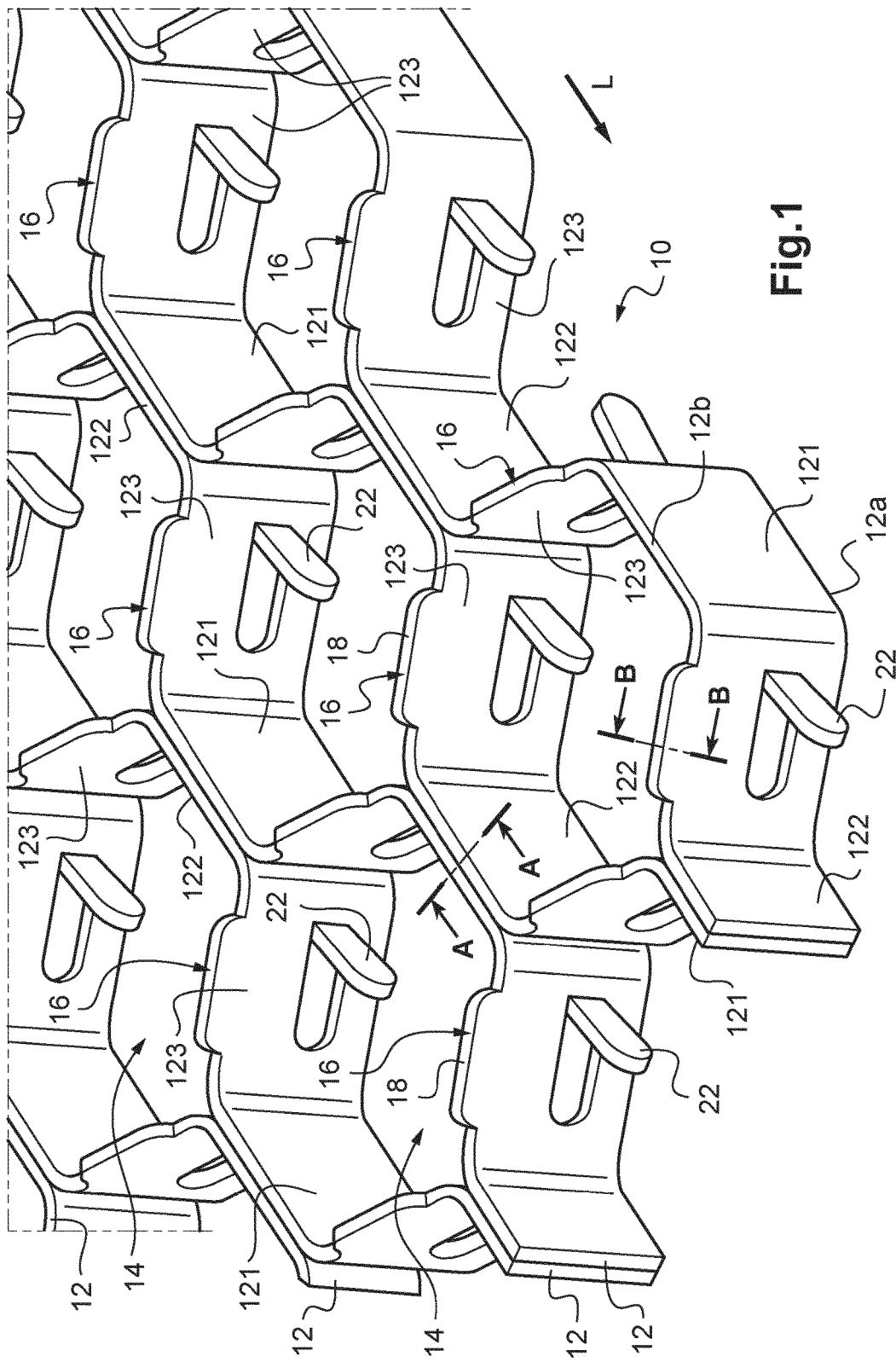

delimiting edge (18) that is a predetermined distance away from a plane defined by the upper edge (12b) of the anchoring element.

6 Claims, 3 Drawing Sheets

(51) Int. Cl.
 *F23M 5/04* (2006.01)
 *B32B 15/18* (2006.01)
 *B32B 3/12* (2006.01)
 *B01J 8/18* (2006.01)
 *C10G 11/18* (2006.01)
 *C22C 38/04* (2006.01)
 *C22C 38/50* (2006.01)

(52) U.S. Cl.
 CPC .............. *C10G 11/18* (2013.01); *C22C 38/04* (2013.01); *C22C 38/50* (2013.01); *F23M 5/04* (2013.01); *F27D 1/1684* (2013.01); *B32B 2307/752* (2013.01)

(58) Field of Classification Search
 CPC .. F23M 5/04; B32B 15/18; B32B 3/12; B32B 2307/752
 See application file for complete search history.

(56) References Cited

U.S. PATENT DOCUMENTS

| | | | | |
|---|---|---|---|---|
| 4,254,188 A * | 3/1981 | Campbell | ........... | B64G 1/22 428/594 |
| 4,651,487 A * | 3/1987 | Nishikawa | ........... | F27D 1/141 110/336 |
| 4,660,343 A * | 4/1987 | Raycher | ........... | B01D 3/326 52/334 |
| 4,711,186 A * | 12/1987 | Chen | ........... | B01J 19/0053 110/336 |
| 4,753,053 A * | 6/1988 | Heard | ........... | F27D 1/141 110/336 |
| D375,892 S * | 11/1996 | Kraemer, Jr. | ........... | D8/384 |
| D393,588 S * | 4/1998 | Tuthill | ........... | D8/384 |
| 6,003,283 A * | 12/1999 | Hull | ........... | E04C 2/365 52/783.15 |
| 6,393,789 B1 * | 5/2002 | Lanclos | ........... | B04C 5/085 110/338 |
| 6,887,551 B2 * | 5/2005 | Hyde | ........... | B32B 3/12 428/99 |
| 7,178,299 B2 * | 2/2007 | Hyde | ........... | E04C 5/04 428/44 |
| 8,656,679 B1 * | 2/2014 | Duhon | ........... | C10G 75/00 52/334 |
| 2003/0143418 A1 * | 7/2003 | Wang | ........... | B05D 7/14 428/593 |
| 2003/0232603 A1 * | 12/2003 | Tanaka | ........... | H01P 1/2005 455/90.3 |
| 2007/0298212 A1 * | 12/2007 | Wang | ........... | B05D 7/16 428/116 |
| 2013/0011184 A1 * | 1/2013 | De Smet | ........... | F16G 1/12 403/270 |
| 2013/0108519 A1 | 5/2013 | Sandacz | | |
| 2015/0147236 A1 * | 5/2015 | Simon | ........... | B32B 3/12 422/143 |
| 2017/0104207 A1 * | 4/2017 | Rubino | ........... | H01M 4/131 |

\* cited by examiner

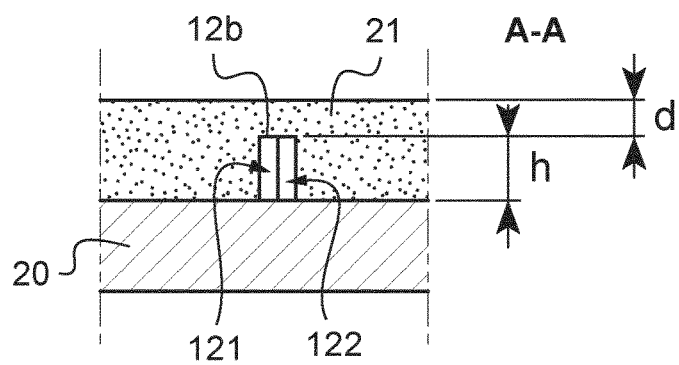
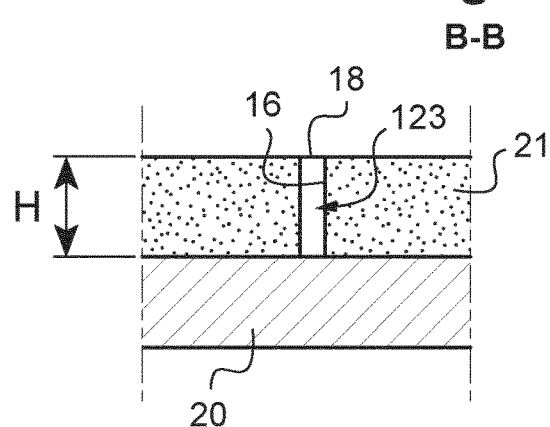
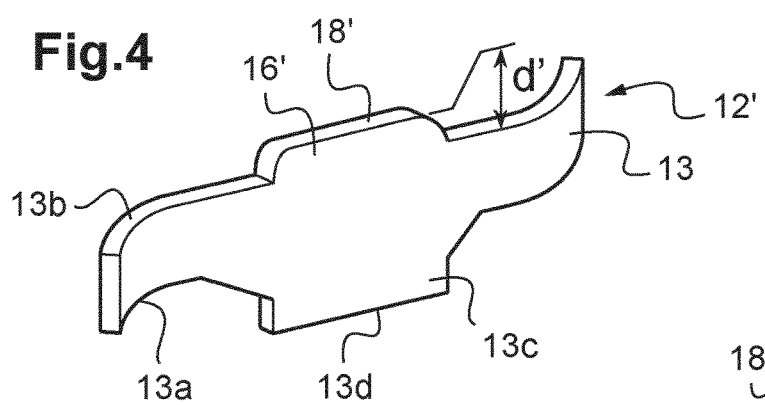
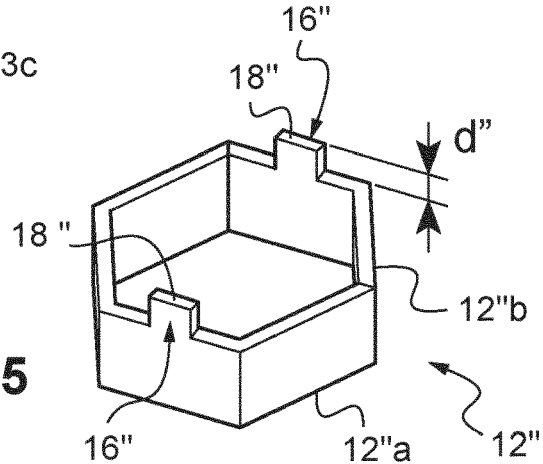

ELEMENT FOR ANCHORING AN ANTI-EROSION COATING TO AN INNER WALL OF A CHAMBER OF AN FCC UNIT

CROSS-REFERENCE TO RELATED APPLICATIONS

This application claims the benefit of PCT/EP2015/075515 filed Nov. 3, 2015, which claims priority from FR 1460778 filed Nov. 7, 2014.

The invention relates to an element for anchoring an anti-erosion coating to an inner or outer wall of a chamber of a fluid catalytic cracking (FCC) unit.

The invention relates in particular to an element for anchoring an anti-erosion coating that is intended to protect a wall of a cyclone, reactor plenum, stripper, riser, downer, standpipes, withdrawal wells or disengager that is part of a fluid catalytic cracking unit.

The invention also relates to an anchoring structure formed from the assembly of anchoring elements according to the invention, a coating using anchoring elements or an anchoring structure according to the invention and a process for producing an anti-erosion coating using anchoring elements according to the invention.

The metal walls of the various chambers of an FCC unit, such as for example a disengager and a regenerator, and the metal walls of the internal equipment located in the regenerator or the disengager, in particular the cyclones, may undergo erosion due to the circulation of the catalyst particles in the unit, and, at the regenerator, a bulk corrosion by the gases produced during the combustion that makes it possible to regenerate the catalyst. It is therefore necessary to protect these metal walls in order to lengthen their service life.

The metal walls of the chambers of a catalytic cracking unit and of the equipment inside these chambers are thus covered with a coating intended to protect them mainly from erosion. Such coatings generally consist of a composite material, generally a concrete, held by an anchoring structure, which is usually metallic. These anchoring structures are welded to the metal walls and thus provide the attachment of the composite material. They may be in various forms. Thus, they may be a plurality of hexagonal cells firmly attached to one another by one side so as to form a honeycomb structure (Hexmesh®). Use is also made of strips of S-shape, K-shape or any other geometric shape, extending parallel to the wall, anchored in the wall by a support foot perpendicular to the wall. Such S-shaped or K-shaped strips are also referred to as "S bars" or "K bars" and are rather used in an isolated manner, for example on surfaces of complex geometry that cannot receive a honeycomb anchoring structure. Hexagonal-shaped anchoring elements are also used in an isolated manner for anchoring to surfaces of complex geometry. Like S bars, these hexagonal-shaped anchoring elements are, most often, used in isolation, without contact with adjacent anchoring elements. Honeycomb-type structures also exist having square cells formed of strips connected in pairs by rods forming axes of rotation (Flexmesh®). This type of structure has the advantage of being able to closely fit a curved wall without prior shaping.

After fastening these anchoring elements to the metal wall to be protected, a composite material is applied to the metal wall equipped with anchoring elements so as to cover the latter. However, this composite material is generally applied and smoothed using a board (float or trowel) pressing against the anchoring elements, so that in practice the concrete is flush with the top of the anchoring elements. It may happen that certain anchoring elements are not completely covered with concrete and that interstices remain that enable the diffusion of gases between the concrete and the anchoring, or between two assembled anchorings. The penetration of catalyst particles into these interstices is also possible at these locations.

Moreover, the difference in expansion coefficient between the metal anchoring and the concrete causes, when they are exposed to high temperature under the operating conditions of the FCC unit, the appearance of interstices between the side walls of the concrete biscuits and the anchoring, here again enabling the diffusion of the gaseous species resulting from the process and of catalyst.

When this coating is in contact with the gases resulting from the cracking of the feedstock, for example in the disengager or on the cyclones located in the disengager, these gases may lead to the formation of coke inside these interstices. This formation of coke may lead to a significant detachment of the coating during successive cooling/heating cycles of the chamber.

When the coating is in contact with a gas containing, inter alia, oxygen, carbon oxides, sulfur and nitrogen, such as for example the gases present in a regenerator or in the internal equipment of a regenerator, in particular the cyclones, plenum, standpipe, this gas penetrates through the interstices of the coating and causes sulphidation, carburization and oxidation phenomena, in particular at the welds that fasten the metal anchoring structure to the metal walls, which may cause a disconnection of the anchoring structure.

Irrespective of the degradation phenomena observed, corrosion, especially by sulphidation, carburization, oxidation or formation of coke, the applicant has observed that these phenomena essentially occur at the metal anchoring structure and/or its bonding via welding to the metal walls, and in particular at the juxtaposed parts of the anchoring structure in the case of honeycomb-shaped anchoring structures.

There is therefore a need for an anti-erosion coating anchoring element that is more resistant to the degradation phenomena, in particular to corrosion, especially by sulphidation, carburization, oxidation or formation of coke.

In order to solve this problem, the applicant has proposed, in application WO 2014/0092625 A1, a particular process for producing a coating for a honeycomb anchoring structure, which especially comprised a particular step of fastening by welding of the anchoring structure. It was also proposed to produce honeycomb structures having different heights at their assembled walls in order to promote the filling of the interstices between these assembled walls with the composite material. The process described does not however relate to the anchoring elements used in an isolated manner.

The invention aims to overcome the aforementioned drawbacks by proposing a metal element for anchoring an anti-erosion coating to an inner or outer metal wall of a chamber of a fluid catalytic cracking unit, said element being intended to be fastened alone in an isolated manner to said metal wall, such as for example the anchoring elements of S-bar or K-bar type or of hexagonal shape mentioned above, or being intended to be fastened to said metal wall assembled with other identical anchoring elements, such as the honeycomb anchoring structures (Hexmesh®, Flexmesh®).

The anchoring element according to the invention has a fastening edge intended to be fastened to the metal wall to be protected and an anchoring body firmly attached to the fastening edge, said anchoring body having an upper edge that is away from the fastening edge and intended to be covered by a composite material of concrete type, this upper edge defining a plane.

According to the invention, at least one section of the upper edge, which is not intended to be juxtaposed and assembled with an upper edge of another identical anchoring element, is provided with a delimiting tab in order to delimit a height of composite material that must cover the upper edge of said anchoring element, said delimiting tab having a delimiting edge that is a predetermined distance away from the plane defined by the upper edge of the anchoring element.

Thus, this delimiting tab will serve as a marker during the application of the composite material, the worker being able to smooth the composite material to the height of the delimiting edge of this delimiting tab with the smoothing tool (float or trowel). In this way, the rest of the anchoring element, in particular the rest of the upper edge, located further back with respect to the delimiting tab, is covered with a layer of composite material at least equal to the predetermined distance, making it possible to limit the formation of an interstice that lets the corrosive gases through.

Moreover, the applicant has observed that the creation of a delimiting tab on a part of the anchoring element not assembled with another anchoring element makes it possible to reduce the formation of interstices between the assembled parts after application of the composite material.

The predetermined distance may be selected so that, once dry, the composite material of concrete type is still flush with the delimiting tab or tabs. By way of example, this distance may be at least 2 mm, for example less than or equal to 10 mm, preferably less than or equal to 6 mm, or even less than or equal to 3 mm.

Advantageously and non-limitingly, the section may extend over a part of the length of the upper edge. For example, the delimiting tab may extend at most over ½ or at most over ¼ of the length of the upper edge, in particular of the length of the section of the upper edge provided with the delimiting tab, this being in order to limit the potential zones for introducing gas. Indeed, it is sufficient for the delimiting tab to project from the upper edge in order to be able to be spotted by the worker applying the composite material. By way of example, the length of the delimiting tab, and in particular of its delimiting edge, is from 10 to 22 mm.

The delimiting tab may be positioned in the middle of said upper edge, which may simplify the production of the anchoring element.

Advantageously and non-limitingly, the anchoring body may be formed by folding or bending a flat strip along an axis perpendicular to a longitudinal direction of the strip, in the plane of the strip, and said delimiting tab extends in the continuation of said flat strip perpendicular to said longitudinal direction. In other words, the delimiting tab then corresponds to a zone of the flat strip of greater width. The delimiting tab may thus be obtained simply, in particular when it is produced from one part with the anchoring body.

Advantageously and non-limitingly, the anchoring element is made of stainless steel (a stainless steel contains at most 1.2% by weight of carbon and at least 10.5% by weight of chromium according to the EN10008 standard). In particular, the stainless steel will be able to be selected so as to withstand the environment of the chamber in which the anchoring structure must be used.

The anchoring element may thus be made of austenitic stainless steel selected from the following steels:

- a stainless steel containing from 0.04% to 0.10% by weight of carbon, from 18% to 20% by weight of chromium and from 8% to 10.5% by weight of nickel, and with a manganese content of at most 2% by weight, for example a steel of AISI 304H grade,
- a stainless steel containing from 0.04% to 0.10% by weight of carbon, from 17% to 19% by weight of chromium and from 9% to 12% by weight of nickel, and with a niobium content of from 8 times the carbon content to 1% by weight, for example a steel of AISI 347 grade,
- a stainless steel containing at most 0.015% by weight of carbon, from 15% to 17% by weight of chromium and from 33% to 37% by weight of nickel, for example a steel of AISI 330 grade,
- a stainless steel containing at most 0.10% by weight of carbon, from 24% to 26% by weight of chromium and from 19% to 22% of nickel, for example a steel of AISI 310 grade,
- a stainless steel containing at most 0.08% by weight of carbon, from 17% to 19% by weight of chromium, from 9% to 12% by weight of nickel, a titanium content of from 5 times the carbon content to 0.70% by weight, a manganese content of at most 2% by weight, a silicon content of at most 1% by weight, for example a steel of AISI 321 grade,
- a stainless steel containing at most 0.15% by weight of carbon, from 11.5% to 13.5% by weight of chromium, a manganese content of at most 1% by weight, a silicon content of at most 1% by weight, for example a steel of AISI 410 grade.

Such austenitic stainless steels may make it possible to reduce the degradations due to a loss of the stainless nature of the steel by a drop in the chromium content below 10.5% by weight within the steel.

The anchoring element according to the invention may be intended to be fastened to the metal wall without contact with another anchoring element.

According to one embodiment, the upper edge of the anchoring body may then have an S shape and the section of the upper edge provided with a delimiting tab may be a curved section.

The delimiting tab may then be positioned substantially in the middle of the upper edge of the anchoring body.

In this embodiment, the fastening edge may be part of a foot firmly attached to the anchoring body, so that the fastening edge is away from the anchoring body. Such a fastening foot may also extend in the continuation of the anchoring body, in the middle thereof.

Such an anchoring element may be produced by bending a flat strip along an axis perpendicular to a longitudinal direction of the strip. Optionally, the strip may be precut in order to form the delimiting tab and the fastening foot, the rest of the strip having a constant width.

According to another embodiment, the upper edge of the anchoring body has a K shape and the section of the upper edge provided with a delimiting tab is a straight section.

According to another embodiment, the upper edge of the anchoring body may have a hexagonal shape and said at least one section of the upper edge provided with a delimiting tab may be part of a straight side of the hexagonal shape.

Preferably, the section does not then extend over the whole of the length of one straight side.

Advantageously, at least two opposite sides of said upper edge of hexagonal shape may be provided with a delimiting tab, which may facilitate an arrangement of a coating layer of uniform thickness on top of the anchoring element owing to the two markers formed by the opposite delimiting tabs.

Such an anchoring element may be produced by folding a flat strip along an axis perpendicular to a longitudinal direction of the strip, then assembling the ends of the strip in order to form a hexagon. Optionally, the strip may be precut in order to form the delimiting tab. The fastening edge then also has a hexagonal shape and defines a plane different from the plane of the upper edge.

The anchoring element according to the invention may also be intended to be fastened to the metal wall, assembled with other identical anchoring elements in order to form a honeycomb-type anchoring structure. The body of said anchoring element may then be formed from a strip divided along its length into a plurality of portions, first strip portions extending in a first plane parallel to the longitudinal direction (L) of the strip, second strip portions extending in a second plane parallel to the first plane and different from the first plane, third strip portions each connecting a first strip portion to a second strip portion, the first and second strip portions being alternated over the entire length of the strip.

According to the invention, said at least one section of the upper edge provided with a delimiting tab of each anchoring element may then be part of an upper edge of a third portion of the strip of this anchoring element.

Preferably, the section does not then extend over the whole of the length of the upper edge of a third portion of the strip.

Advantageously, each third portion of a strip of an anchoring element may be provided with a delimiting tab, which may promote the obtaining of a coating of composite material of uniform thickness over the entire area of the anchoring structure. However, provision may be made for one third portion out of two or three only to be provided with a delimiting tab.

Such anchoring elements may be assembled in various ways.

According to a first embodiment, the first portions of a strip of an anchoring element are intended to be juxtaposed and assembled with the second portions of an adjacent strip so as to form hexagonal cells. Thus, the delimiting tab is not on a portion assembled with another anchoring element. In other words, the assembled portions of two anchoring elements are then of the same height (in a lower plane).

The invention thus also relates to a honeycomb structure for anchoring an anti-erosion coating to an inner or outer metal wall of a chamber of a fluid catalytic cracking unit formed from an assembly of the anchoring elements described above, in particular of identical anchoring elements, in which the first portions of a strip of an anchoring element are juxtaposed and assembled with the second portions of a strip of an adjacent anchoring element so as to form hexagonal cells.

According to another embodiment, each first portion joined to two third portions of a same anchoring element has a U shape which is intended to be partly nested in the U shape of each first portion joined to two third portions of an adjacent anchoring element so that the third portions of two adjacent anchoring elements are partly juxtaposed. These juxtaposed parts of the third portions of assembled anchoring elements are then passed through by a rod extending in the longitudinal direction of the strips of the adjacent anchoring elements, the concavities of the U shapes being pointed in a same direction. Such an arrangement enables a rotation of two adjacent anchoring elements about the assembly rods.

The delimiting tabs could, as a variant, be provided on the upper edge of the first and second portions of an anchoring element of this type. However, for an easier arrangement of the composite material, it is preferable that the section of the upper edge provided with a delimiting tab of each anchoring element is part of an upper edge of a third portion of the strip of said anchoring element.

The invention also relates to a honeycomb structure for anchoring an anti-erosion coating to an inner or outer metal wall of a chamber of a fluid catalytic cracking unit formed from an assembly of the anchoring elements described above, in particular of identical anchoring elements, in which each first portion joined to two third portions of a same anchoring element has a U shape partly nested in the U shape of each first portion joined to two third portions of an adjacent anchoring element so that the third portions of two adjacent anchoring elements are partly juxtaposed, the concavities of the U shapes being pointed in a same direction so as to form four-sided cells, these juxtaposed parts of the third portions of adjacent anchoring elements being passed through by a rod extending in the longitudinal direction (L) of the strips of the adjacent anchoring elements.

An anchoring structure according to the invention may additionally comprise one or more of the anchoring elements described above. It may in particular comprise a plurality of anchoring elements of different shapes, some of which may be identical to one another and optionally assembled, each anchoring element having one delimiting tab at least, the delimiting edge of which is located at a same distance from its upper edge and from its lower edge.

The invention additionally relates to an anti-erosion coating comprising at least one anchoring element according to the invention embedded in a composite material, for example a concrete, the composite material extending up to the delimiting edge of said delimiting tab, above the upper edge of said at least one anchoring element, so that the composite material covers or is flush with the delimiting edge of said delimiting tab. Interstices are thus less capable of forming with such a coating, in particular at the zones of contact of the anchoring element and of the composite material or between zones of contact of two assembled anchoring elements. The risk of formation of interstices, and consequently a degradation of the coating, could be reduced even more when the length of the delimiting tabs is short, for example less than or equal to 22 mm, preferably less than or equal to 15 mm.

The composite material, within the meaning of the present invention, is preferably a material resulting from an assembly of at least two immiscible materials having a high adhesion capacity. Preferably, the composite material is a composite construction material such as a concrete, in particular a concrete suitable for use in a fluid catalytic cracking unit.

The anti-erosion coating may comprise one or more isolated anchoring elements according to the invention, intended to be fastened alone in an isolated manner to said metal wall, in other words without contact with an adjacent anchoring element.

As a variant or in combination, the anti-erosion coating may comprise several anchoring elements according to the invention assembled with other identical anchoring elements in order to form an anchoring structure, for example a honeycomb anchoring structure.

Advantageously, the anti-erosion coating may comprise a plurality of anchoring elements of different shapes, optionally in combination with a plurality of assembled identical anchoring elements, each anchoring element having at least one delimiting tab, the delimiting edge of which is located at a same distance from its upper edge and from its lower edge. A coating of uniform thickness over the entire surface of the wall to be protected may thus be obtained.

The invention also relates to a chamber of a fluid catalytic cracking unit comprising at least one inner or outer metal wall covered with at least one coating according to the invention, the fastening edge of each anchoring element being fastened by welding to the inner or outer wall of the chamber.

Advantageously and non-limitingly, the metal wall to which the coating is applied is an inner or outer wall of a cyclone, of a regenerator, of a disengager or of any other internal equipment of a fluid catalytic cracking unit, such as a riser, stripper, standpipe, flue gas line, transfer line between reactor and fractionator, orifice chamber, slide valve or withdrawal wells.

The invention finally relates to a process for producing an anti-erosion coating on an inner or outer metal wall of a chamber of a fluid catalytic cracking unit, comprising:
(i) the fastening of a plurality of anchoring elements according to the invention, optionally certain anchoring elements being preassembled with one another, to said metal wall, this fastening being carried out by welding to the metal wall of the fastening edge of each anchoring element,
(ii) the application of a layer of a composite material to the metal wall, the thickness of this layer being selected so that the composite material covers or is flush with the delimiting edge of the delimiting tabs of each anchoring element.

The composite material is thus applied so as the remaining part of the upper edge of each anchoring element is covered by a layer of composite material, the thickness of which is at least equal to the predetermined distance previously defined.

Figure 6:
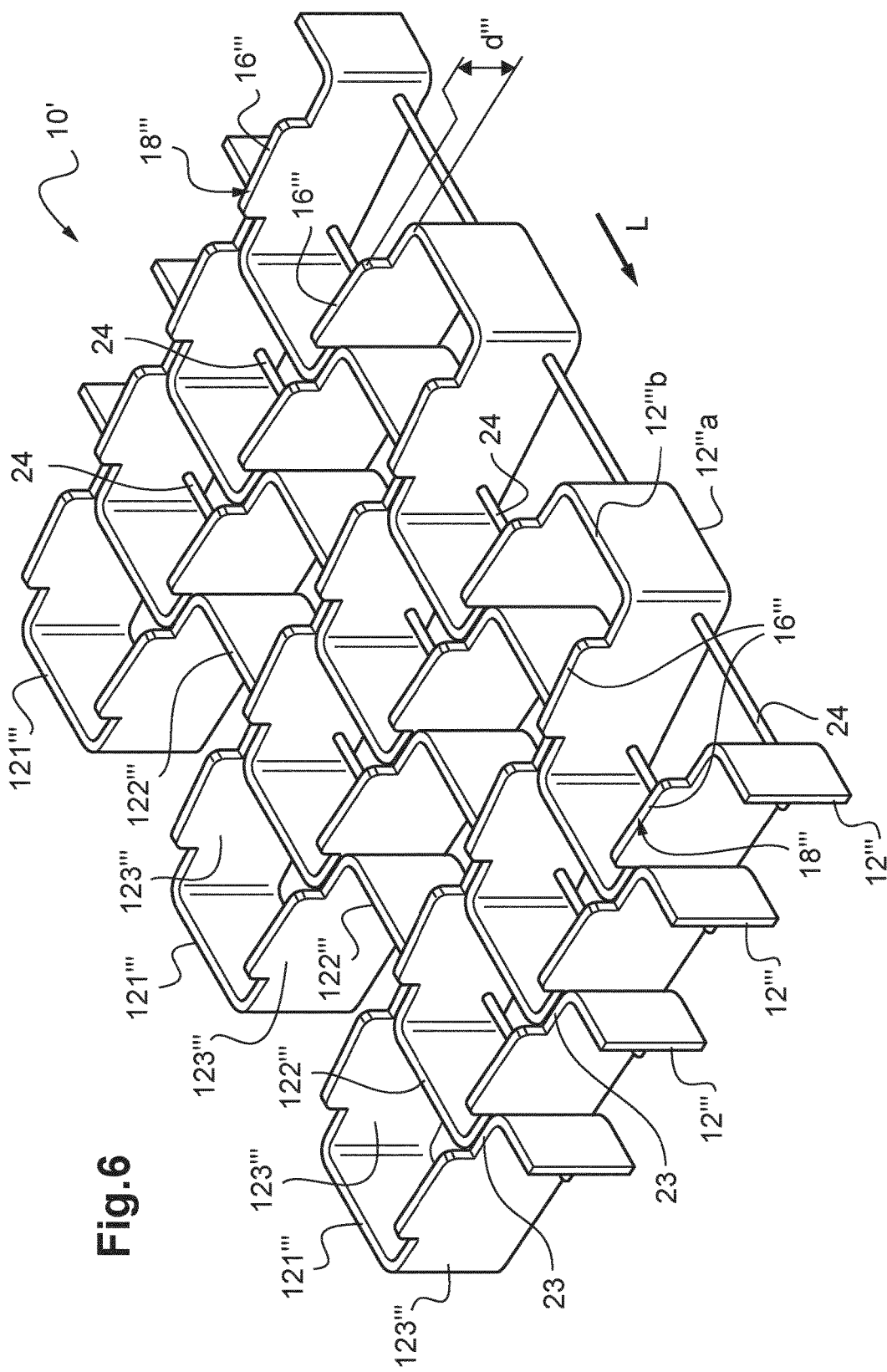

The invention is now described with reference to the appended, non-limiting drawings, in which:
FIG. 1 is a representation, in perspective, of anchoring elements according to one embodiment of the invention that form a honeycomb-shaped anchoring structure;
FIG. 2 is a cross-sectional view along the line A-A of the anchoring structure represented in FIG. 1, the anchoring structure being fastened to a metal wall and embedded in a composite material;
FIG. 3 is a cross-sectional view along the line B-B of the anchoring structure represented in FIG. 1, the anchoring structure being fastened to a metal wall and embedded in a composite material;
FIG. 4 is a representation, in perspective, of an anchoring element according to a second embodiment of the invention;
FIG. 5 is a representation, in perspective, of an anchoring element according to a third embodiment of the invention;
FIG. 6 is a representation, in perspective, of anchoring elements according to a fourth embodiment of the invention that form a honeycomb-type anchoring structure, the cells of which have four sides.

FIG. 1 partially represents a honeycomb metal anchoring structure 10 formed of a plurality of strips 12 assembled in pairs so as to form a plurality of hexagonal cells 14 connected by their sides to one another. Each strip 12 forms an anchoring element according to a first embodiment of the invention.

The term "strip" is understood to mean a strip of metal material having a width smaller than a length and a thickness smaller than the width. Preferably, the strip has a constant width over its entire length, with the exception of the delimiting tabs, as will be described below.

By way of example, the internal dimensions of the cells may vary from 4 to 6 cm for a thickness of around 1.5 to 3.0 cm, for example of 2 cm.

Each strip 12, made from one part, is divided along its length into a plurality of portions 121, 122, 123:
first strip portions 121 that extend in a first plane parallel to the longitudinal direction L of the strip,
second strip portions 122 that extend in a second plane parallel to the first plane and different therefrom,
third strip portions 123 that each connect a first strip portion 121 to a second strip portion 122.

Such an anchoring element 12 may be produced by folding a flat strip along a direction perpendicular to its longitudinal direction (L), in the plane of the strip.

The first strip portions 121 and second strip portions 122 are alternated over the entire length of a strip 12 and the first portions 121 of one strip are juxtaposed and assembled with the second portions 122 of an adjacent strip 12, for example by welding and/or by fastening means. The first strip portions 121 and second strip portions 122 thus form portions for assembly to an adjacent strip 12.

The anchoring structure 10 represented is here formed of a plurality of identical strips 12. Each strip 12 has a lower longitudinal edge 12a contained in a single plane and an upper longitudinal edge 12b parallel to the lower longitudinal edge 12a. This longitudinal edge 12b defines a single plane with the except of the delimiting tabs.

The lower longitudinal edge 12a forms a fastening edge of the anchoring element 12, the strip 12 by itself forming an anchoring body within the meaning of the invention.

According to the invention, a section of the upper edge 12b, which is not intended to be juxtaposed and assembled with an upper edge of an identical adjacent anchoring element, is provided with a delimiting tab 16 in order to delimit a height of composite material that must cover the upper edge of the anchoring element. For this purpose, the delimiting tab 16 has a delimiting edge 18 that is a predetermined distance away from the plane defined by the upper edge 12b of the anchoring element 12. In other words, in the present example, as seen in FIG. 1, the delimiting edge 18 of the delimiting tab 16 extends parallel to the lower edges 12a and upper edges 12b.

FIGS. 2 and 3 are cross-sectional views along the lines A-A and B-B from FIG. 1, to the same scale. In these figures, a metal wall 20 is distinguished, to which the anchoring structure 10 is fastened. This fastening is carried out by welding the fastening edge 12a to the wall 20. FIG. 2 represents assembled portions 121 and 122 of the anchoring structure. A layer 21 of composite material covers the upper edges 12b of these assembly portions 121, 122. This layer 21 extends over a height H (measured from the metal wall 20, perpendicular thereto) so that the surface of the layer 21 of composite material is flush with the delimiting edge 18 of the delimiting tab 16 (FIG. 3). Thus, for a strip of height h (in other words of width h), a thickness d of composite material 21 covers the upper edges 12b of the anchoring element, the total height H of the layer 21 being equal to the sum of the height h and of the thickness d. This thickness d thus corresponds to the predetermined distance separating the delimiting edge 18 from the plane defined by the upper edge 12b of the anchoring element 12.

By thus using the delimiting edges 18 of the tabs 16 to produce a coating of predetermined thickness, one is certain to completely cover the anchoring element 12, in particular its assembly portions 121, 122 and to thus avoid the formation of interstices, and a layer of composite material of uniform thickness is produced.

In the example, each third portion 123 is provided with a delimiting tab 16, which extends over a part of the length of the upper edge of this third portion 123.

As represented in FIG. 1, an anchoring element 12 may additionally have a flap of material 22 cut from at least one portion other than an assembly portion (i.e. here a portion 123) and folded in order to jut out from this portion. Such a configuration may make it possible to improve the anchoring of the composite material to the anchoring element, the flap then being embedded in the composite material, the hold of which is also strengthened due to the fact that it passes through the orifice freed up by the folded-out flap.

The flaps 22 of material resulting from portions that are part of a same cell may be folded out towards one another. This arrangement makes it possible to obtain two flaps folded out towards the centre of each cell when the strips are assembled with one another.

These flaps 22 may also be folded out so as to extend substantially parallel to the planes of the strip assembly portions.

The anchoring structure 10 represented in FIG. 1 may be shaped before the fastening thereof to a metal wall, for example by roll bending in order to closely match the shape of this metal wall.

When the metal wall to be protected has a more complex shape, it may then be difficult, or even impossible, to fasten an anchoring structure of the type of that described with reference to FIG. 1. It is then possible to use isolated anchoring elements of the type of those described with reference to FIGS. 4 and 5, or articulated anchoring elements, of the type of those described with reference to FIG. 6.

FIG. 4 represents an anchoring element 12' according to another embodiment of the invention.

The anchoring element 12' has an anchoring body 13, the upper edge 13*b* of which has an S shape, defines in the plane of the upper edge 13*b*. Here, this anchoring body 13 is in the form of a flat strip bent along a direction perpendicular to its longitudinal direction, in the plane of the strip. The lower edge 13*a* of this anchoring body 13 is firmly attached to a support foot 13*c* that extends perpendicular to the longitudinal direction of the strip. This support foot 13*c* has a fastening edge 13*d*, via which the anchoring element 12' may be welded to the metal wall to be protected.

According to the invention, an optionally curved section of the upper edge 13*b* comprises a delimiting tab 16', the delimiting edge 18' of which is a predetermined distance d' away from the plane defined by the upper edge 13*b*. The length of the delimiting tab 16', i.e. here the length of the optionally curved section, is preferably equal to a quarter or less of the total length of the upper edge 13*b*.

Such an anchoring element 12' is intended to be fastened to the metal wall without contact with another anchoring element.

FIG. 5 represents an anchoring element 12" according to yet another embodiment of the invention.

This anchoring element 12" has a hexagonal shape. It is obtained by folding a flat strip along a direction perpendicular to the longitudinal direction of the strip, in the plane of the strip, the ends of the strip being joined in order to close up the hexagonal shape. The structure obtained thus forms a cell that may be filled and covered with composite material. The anchoring element 12" has a lower edge 12"*a* forming a fastening edge, via which it may be welded to a metal wall to be protected. The folded strip by itself forms an anchoring body. The anchoring element 12" has an upper edge 12"*b* of hexagonal shape that defines a plane, here parallel to the plane of the lower edge 12"*a*.

According to the invention, a section of the upper edge 12"*b* comprises a delimiting tab 16", the delimiting edge 18" of which is a predetermined distance d" away from the plane defined by the upper edge 12"*b*. Here, the anchoring element 12" has two delimiting tabs 16" positioned on opposite edges of the hexagonal shape. These tabs 16" are thus parallel, which may facilitate the application of the composite material.

The length of the delimiting tab 16", i.e. here the length of the straight section, is preferably equal to half or less of the total length of the upper edge 12"*b*.

As for the embodiment described above, the anchoring element 12" is intended to be fastened to the metal wall without contact with another anchoring element. The presence of a delimiting tab 16' or 16" in these two embodiments then makes it possible to ensure that the rest of the upper edge 13*b* or 12"*b* of the anchoring body is completely covered with composite material, thus limiting the risks of infiltrations of corrosive gas between the anchoring element and the composite material, while maintaining a constant height of composite material owing to the marker of the delimiting tab.

FIG. 6 represents a metal anchoring structure 10' of honeycomb type formed from a plurality of anchoring elements 12''' according to yet another embodiment of the invention.

This embodiment is similar to that described with reference to FIG. 1, each anchoring element 12''' being formed from a strip, these strips being assembled in pairs so as to form a plurality of four-sided cells. The term "strip" has the same meaning as that already given. These strips may be produced as already described for the first embodiment.

Each strip 12''', made from one part, is divided along its length into a plurality of portions 121''', 122''', 123''':
  first strip portions 121''' that extend in a first plane parallel to the longitudinal direction L of the strip,
  second strip portions 122''' that extend in a second plane parallel to the first plane and different therefrom,
  third strip portions 123''' that each connect a first strip portion 121''' to a second strip portion 122'''.

The first strip portions 121''' and second strip portions 122''' are alternated over the entire length of a strip 12'''. Here, each first portion 121''' joined to two third portions 123''' of a same anchoring element has a U shape which is partly nested in the U shape of each first portion 121''' joined to two third portions 123''' of an adjacent anchoring element so that the third portions 123''' of two adjacent anchoring elements are partly juxtaposed, forming four-sided cells (FIG. 6). The concavities of the U shapes thus defined are all pointed in a same direction. These juxtaposed parts 23 of the third portions 123''' of adjacent anchoring elements are additionally passed through by a rod 24 extending in the longitudinal direction L of the strips of the adjacent anchoring elements.

An articulated anchoring structure 10' is thus obtained, it being possible for each anchoring element 12''' to pivot with respect to an adjacent anchoring element 12''' by rotation about a rod 24.

The anchoring structure 10' represented is here formed of a plurality of identical strips 12'''. Each strip 12''' has a lower longitudinal edge 12'''*a* contained in a single plane and an upper longitudinal edge 12'''*b* parallel to the lower longitudinal edge 12'''*a*.

The lower longitudinal edge 12'''a forms a fastening edge of the anchoring element 12''', the strip 12''' by itself forming an anchoring body within the meaning of the invention.

According to the invention, a section of the upper edge 12'''b, which is not intended to be juxtaposed and assembled with an upper edge of an identical adjacent anchoring element, is provided with a delimiting tab 16''' in order to delimit a height of composite material that must cover the upper edge of the anchoring element. For this purpose, the delimiting tab 16''' has a delimiting edge 18''' that is a predetermined distance d''' away from the plane defined by the upper edge 12'''b of the anchoring element 12'''. In other words, the delimiting edge 18''' of the delimiting tab 16''' extends parallel to the lower edges 12'''a and upper edges 12'''b.

In the example, each third portion 123''' is provided with a delimiting tab 16''', which extends over a part of the length of the upper edge of this third portion 123'' not juxtaposed with a third portion 123''' of an adjacent anchoring element 12'''. Such an arrangement facilitates the positioning of the composite material.

Thus, by using anchoring elements of different shape but that all have a delimiting tab positioned at a same distance from their fastening edge, it is possible to produce a coating with a constant thickness.

In all the embodiments represented, the delimiting tab 16, 16', 16'', 16''' extends in the continuation of a strip forming the anchoring body. The fastening edge may be part of this strip, for example when it is a lower edge, or may be firmly attached to the strip.

Advantageously, irrespective of the embodiment of an anchoring element, the delimiting tab or tabs are preferably made from one piece with the anchoring body, for example by cutting a strip of constant width, and then shaping this strip, by folding or bending. In the same way, the fastening edge is advantageously integrated into the anchoring body.

It will also be noted that one or more flaps, similar to the flaps 22 described with reference to the embodiment represented in FIG. 1, may be provided on the anchoring bodies of the anchoring elements described with reference to FIGS. 4 to 6 in order to improve the anchoring of the composite material by the anchoring element.

The invention claimed is:

1. A process for producing an anti-erosion coating on an inner or outer metal wall of a chamber of a fluid catalytic cracking unit, comprising:
   (i) fastening a plurality of metal anchoring elements on the metal wall, each anchoring element being fastened alone in an isolated manner to the metal wall or being fastened to the metal wall assembled with other identical anchoring elements, the fastening being carried out by welding to the metal wall a fastening edge of each anchoring element, each anchoring element having:
   a fastening edge fastened to the metal wall, and
   an anchoring body firmly attached to the fastening edge, the anchoring body having an upper edge that is away from the fastening edge and defining a plane,
   wherein at least one section of the upper edge, which is not juxtaposed and assembled with an upper edge of another identical anchoring element, is provided with a delimiting tab in order to delimit a height of composite material that must cover the upper edge of the anchoring element, the delimiting tab having a delimiting edge that is a predetermined distance away from the plane defined by the upper edge of the anchoring element,
   (ii) applying a layer of a composite material to the metal wall, the thickness of this layer being selected so that the composite material covers or is flush with the delimiting edge of the delimiting tabs of each anchoring element and so that the remaining part of the upper edge of each anchoring element is covered by a layer of composite material, the thickness of which is at least equal to the predetermined distance, wherein the anti-erosion coating comprises at least one of the anchoring elements embedded in the composite material, the composite material extending up to the delimiting edge of the delimiting tab, above the upper edge of the at least one anchoring element, so that the composite material covers or is flush with the delimiting edge of the delimiting tab and so that the remaining part of each anchoring element is covered by a layer of the composite material, the thickness of which is at least equal to the predetermined distance.

2. The process of claim 1, wherein the anchoring element is intended to be fastened to the metal wall assembled with other identical anchoring elements in order to form a honeycomb anchoring structure, the anchoring element having a fastening edge intended to be fastened to the metal wall, and an anchoring body firmly attached to the fastening edge, the anchoring body having an upper edge that is away from the fastening edge and intended to be covered by a composite material of concrete type, the upper edge defining a single plane, the anchoring body being formed from a strip divided along its length into a plurality of portions, first strip portions extending in a first plane parallel to the longitudinal direction of the strip, second strip portions extending in a second plane parallel to the first plane and different from the first plane, third strip portions each connecting a first strip portion to a second strip portion, the first and second strip portions being alternated over the entire length of the strip, the anchoring element being characterized in that the:
   at least one section of the upper edge is provided with a delimiting tab in order to delimit a height of composite material that must cover the upper edge of the anchoring element, the delimiting tab having a delimiting edge that is a predetermined distance (d) away from the plane defined by the upper edge of the anchoring element,
   at least one section of the upper edge provided with a delimiting tab is part of an upper edge of a third portion of the strip.

3. The process of claim 2 wherein each third portion of the strip is provided with a delimiting tab.

4. The process of claim 3 wherein the delimiting tab extends over a part of the length of the upper edge.

5. The process of claim 1 wherein in the anchoring element is made of austenitic stainless steel selected from the group consisting of:
   a stainless steel containing from 0.04% to 0.10% by weight of carbon, from 18% to 20% of chromium and from 8% to 10.5% of nickel, and with a manganese content of at most 2% by weight,
   a stainless steel containing from 0.04% to 0.10% by weight of carbon, from 17% to 19% of chromium and from 9% to 12% of nickel, and with a niobium content of from 8 times the carbon content to 1% by weight,
   a stainless steel containing at most 0.015% by weight of carbon, from 15% to 17% of chromium and from 33% to 37% of nickel,
   a stainless steel containing at most 0.10% by weight of carbon, from 24% to 26% of chromium and from 19% to 22% of nickel, a stainless steel containing at most 0.08% by weight of carbon, from 17% to 19% by weight of chromium, from 9% to 12% by weight of nickel, a titanium content of from 5 times the carbon content to 0.70% by weight, a manganese content of at most 2% by weight, a silicon content of at most 1% by weight, and a stainless steel containing at most 0.15% by weight of carbon, from 11.5% to 13.5% by weight of chromium, a manganese content of at most 1% by weight, a silicon content of at most 1% by weight.

6. The process of claim 2 further comprising a structure for anchoring an anti-erosion coating to the inner or the outer metal wall of the chamber of the fluid catalytic cracking unit formed from an assembly of the anchoring elements, in which the first portions of a strip of the anchoring element are juxtaposed and assembled with the second portions of a strip of an adjacent anchoring element so as to form a plurality of hexagonal cells.

* * * * *